INVENTOR.
CLOYED S. BASHAM
BY HIS ATTORNEY

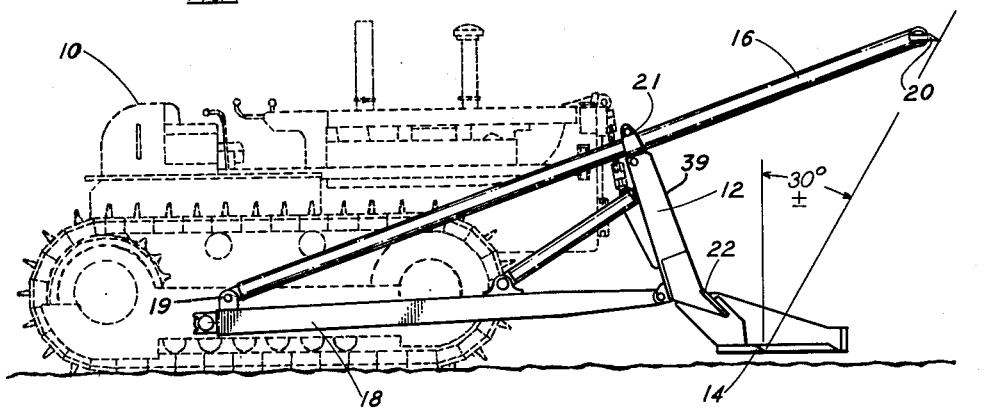
FIG. 1
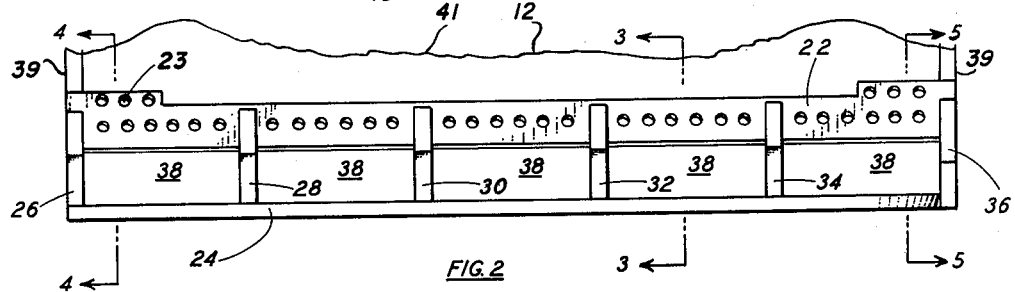
FIG. 2
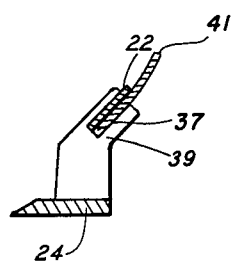
FIG. 3
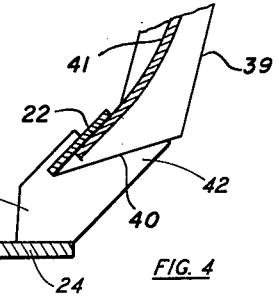
FIG. 4 / FIG. 5
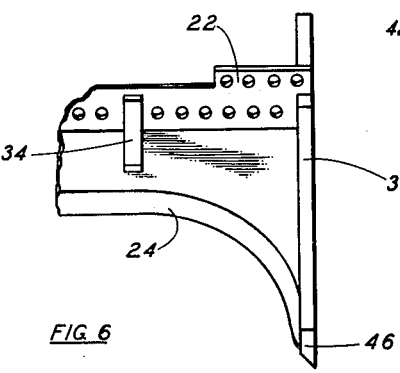
FIG. 6
INVENTOR.
CLOYED S. BASHAM
BY HIS ATTORNEY April 9, 1963 C. S. BASHAM 3,084,727
CUTTING ATTACHMENT FOR USE WITH A MOLDBOARD
Filed March 6, 1961 2 Sheets-Sheet 2

United States Patent Office 3,084,727
Patented Apr. 9, 1963

3,084,727
CUTTING ATTACHMENT FOR USE
WITH A MOLDBOARD
Cloyed S. Basham, Weatherford, Tex.
(746 Havenwood, Dallas 32, Tex.)
Filed Mar. 6, 1961, Ser. No. 93,379
5 Claims. (Cl. 144—34)

The present invention relates to apparatus that is useful for clearing underbrush and timber from land that may be overgrown with such and more particularly to a cutting attachment that can be used with a standard, straight moldboard to more efficiently and economically remove the undesired vegetation.

In many instances it is necessary to remove underbrush and timber from virgin land or land that has lain dormant for such a long period of time that a substantial amount of vegetation is present. In most instances, the vegetation is removed preparatory to excavating work, if construction is anticipated, or leveling operations if the land is to be used for agricultural purposes. Obviously, it would be very advantageous if substantially the same equipment could be used for performing, for example, both the clearing and the leveling operations.

A caterpillar-type tractor equipped with a moldboard is usually used to perform the clearing, leveling, or excavating operations, as the case may be. However, since the moldboard is designed primarily for earth moving operations, the blade is necessarily solid. When the moldboard is used to perform the clearing operation, the blade will pick up a load of dirt as well as the brush or other vegetation that is being cleared and deposit the dirt or a substantial portion of it with the undesired vegetation that is being cleared from the land.

This is undesirable from several aspects. First, it is common to dispose of the undesired vegetation by burning, and the presence of dirt in the stacks of brush and timber slows the burning operation. Second, the deposition of the dirt into what may be piles of substantial size tends to increase the difficulty of the leveling or excavating operation. Still a third factor to be considered in those instances where the land is to be used for agricultural purposes is that most soil removed and placed in the piles is the more desirable top soil and leaf mold which should be left in place.

In an effort to remedy or at least alleviate these problems, a special brush clearing blade for attachment to a caterpillar tractor was devised some years ago. This blade comprised a large heavy metal plate with a cutting edge attached to and extending forwardly from the plate. That portion of the metal plate adjacent to the cutting blade was provided with several relatively large slots. As the blade was pushed along the ground, any dirt which was picked up would travel through the slots and not be substantially displaced. The slots would, of course, be made small enough so that very little of the brush or trees being cleared would pass through the slots but rather would be pushed along to the desired piles or stacks.

Although this blade constituted an advance in art and was used to a substantial extent, it had several inherent disadvantages. Foremost of these was the fact that this special blade was almost as heavy and bulky as a regular moldboard (in the order of six to eight thousand pounds weight) and therefore difficult to move from location to location. In order to utilize this blade it was necessary that the moldboard be completely removed from the caterpillar tractor and this blade attached in its place. Because of the great mass of both blades, this was a very difficult, time-consuming task. Still another important disadvantage of this tool is the fact that it is a very expensive item of equipment.

The present invention provides an apparatus that is capable of the efficient removal of underbrush and trees, but which is not subject to the disadvantages and limitations of the above mentioned apparatus. According to the present invention, the cutting edge that is normally attached to the moldboard is removed and the cutting attachment of the present invention is attached in its place. It is similar to the above described apparatus in that it includes a series of slots forming members attached to a cutting blade. Since it is of relatively light weight (in the order of one thousand pounds), it can be moved by a small truck and handled manually. It can be attached to the moldboard in a very short period of time; thereby allowing a tractor to be readily converted from one type of operation to another.

The cutting attachment of the present invention is also provided with a forwardly protruding member shaped to define a sharply pointed wedge. An arcuate portion of the cutting blade is provided to give a smooth transition from the wedged shaped member to the main portion of the cutting blade. The main purpose of the forwardly protruding wedged shaped member is to allow relatively large trees to be cleared by successively splitting off small portions of the tree with the wedge shaped member until the remainder can be sheared using the main portion of the cutting blade.

Although the above described cutting attachment constitutes an advance over the art and is considered inventive itself, still further improvement can be obtained by using it in combination with what will be referred to as a pusher attachment. The pusher attachment comprises a group of relatively heavy structural members that are connected to the bulldozer push arms and arranged to project ahead of the clearing attachment and bear upon a tree that is to be removed at some height above that at which the main cutting blade will contact the tree. The pusher attachment performs one perhaps obvious function in that it pushes the tree ahead of the tractor and reduces the danger that the tree may topple over the tractor and injure the operator. A second, very important advantage of using the pusher attachment in conjunction with the cutting attachment is that by properly relating the position of the pusher attachment to that of the cutting blade it is possible to greatly increase the effectiveness of the cutting blade. Thus, for example, using the cutting attachment of the present invention or the above described prior art apparatus, it is possible to shear a tree approximately three or four inches in diameter if a tractor of the size denoted D–7 by the Caterpillar Corporation was used. It has been found, however, that by utilizing the cutting attachment of the present invention, with the pusher attachment of the present invention it is possible to cut trees having a diameter of up to ten inches.

The importance of this increase in capability is readily apparent. Not only can this combination be utilized for clearing relatively small underbrush, but it can be utilized for virtually any clearing operation that will be encountered without the necessity of first cutting the larger trees.

These and many other objects and advantages of the present invention will become apparent as the following detailed description of a specific example of the invention unfolds, when taken in conjunction with the appended drawings wherein like numerals denote like parts and in which:

FIGURE 1 is a side view illustrating a caterpillar tractor and moldboard equipped with the cutting attachment and pusher attachment of the present invention;

FIGURE 2 is a front view of the cutting attachment of the present invention;

FIGURE 3 is a view, partially in cross-section, taken along lines 3—3 of FIGURE 2;

FIGURE 4 is a view, partially in cross-section, taken along lines 4—4 of FIGURE 2;

FIGURE 5 is a view, partially in cross-section, taken along lines 5—5 of FIGURE 2 that illustrates the forwardly protruding member that is useful for splitting large trees or stumps;

FIGURE 6 is a plan view of a portion of the cutting attachment that illustrates the manner in which an arcuate portion is provided to connect the wedge shaped member to the main portion of the cutting blade.

Figure 7:
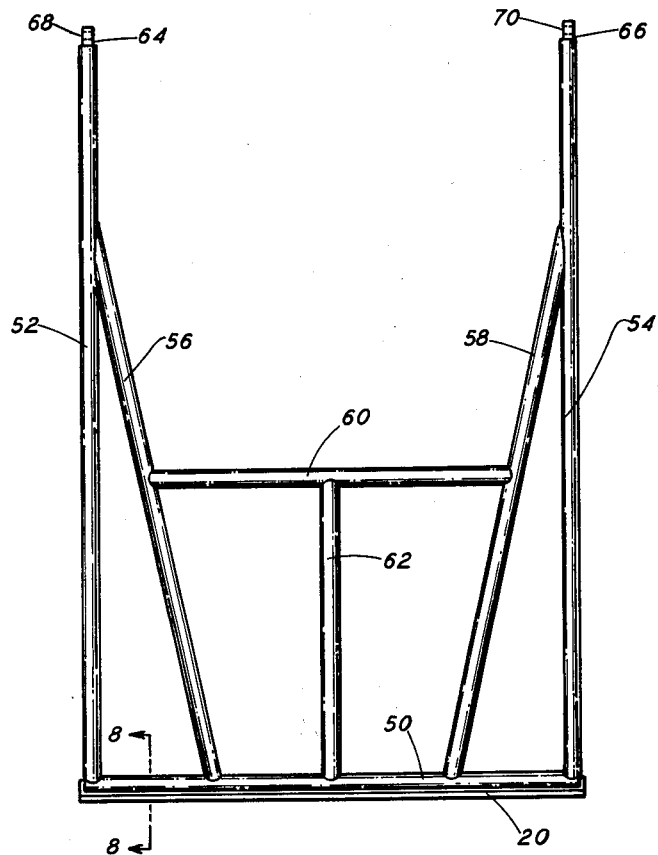
FIGURE 7 is a plan view of the pusher attachment.

Turning now to the detailed description of the invention, reference is made to the drawings, and more particularly to FIGURE 1 of the drawings. In FIGURE 1 there is shown a caterpillar type tractor 10 having a standard moldboard 12 attached to it. The cutting attachment 14 of the present invention is connected to the lower portion of the moldboard 12 using the bolts and holes normally used for attaching the moldboard cutting edge. The pusher attachment 16 is connected to the push arm 18 that supports the moldboard 12 by a bracket and pinion 19. The pusher attachment 16 extends past the cutting attachment 14 and rests upon the upper surface of the moldboard 12.

The pusher attachment 16 is also provided with a blade portion 20. By reference to FIGURE 1, it is seen that a plane touching the leading edge of the main blade portion of the clearing attachment 14 and the leading edge of the blade 20 of the pusher attachment 16 forms an angle of approximately 30 degrees with a vertical plane perpendicular to the direction in which the apparatus is moving. It is readily seen that a tree being cut will be maintained at approximately this 30 degree angle. This angle is important in that if the angle is less than approximately 20 degrees, the desired combination of shearing and fracture will not occur and it will not be possible to shear large diameter trees, although some improvement will be present even if the angle is relatively small. If the angle exceeds 40 degrees, there will be a pronounced tendency for the pusher attachment to slide up the trunk of the tree being cleared instead of maintaining the tree in the desired position. Bracket 21 is provided on top of the moldboard 12 for the purpose of mechanically connecting the pusher assembly 16 to the blade 12 and thereby restricting this movement. The blade 20 digs into the trunk of the tree being cleared and further reduces the tendency for the pusher attachment to slide. In any event, it appears that an angle of approximately 30 degrees is most desirable.

The cutting attachment 14 will now be described in greater detail with reference to FIGURES 2 through 5. As best seen in FIGURE 2, the cutting attachment 14 includes a plate 22 that is provided with a series of holes 23 positioned to register with the holes provided in the moldboard 12 for attaching the cutting edge normally associated with the moldboard 12. The cutting attachment 14 is suitably connected to the blade portion 41 of the moldboard 12 by bolts (not shown) which pass through the holes 23. The cutting blade 24 of the attachment 14 is supported from the plate 22 by supports 26, 28, 30, 32, 34 and 36.

As the cutting attachment is pushed along the ground, with the blade 24 at or in close proximity to the surface of the ground, the blade 24 will occasionally dig into the ground due to the inherently unlevel character of the ground being cleared. Any dirt that is picked up when the blade 24 digs into the ground will pass through the openings 38 and virtually remain in place instead of being pushed along with the brush that is being cleared. However, the openings 38 must be sufficiently small so that a substantial portion of the underbrush being cleared will not pass through them.

The construction details of the cutting attachment 14 may be better understood by reference to FIGURES 3 through 6. The shape of the interior supports 28 through 34 is shown in FIGURE 3. The opening 37 defined by the plate 22 and the rearwardly extending portion 39 of each support 28 through 34 is formed such that the edge of the blade portion 41 of the moldboard 12 will fit the opening 37.

Most moldboards are formed with heavy end plates 39 that contain, to some extent, the material being moved. The end support 26 is of a somewhat different configuration from the interior supports 28 through 34 in that the opening 40 is formed to fit the end plates 39 of the moldboard. The rearwardly extending portion 42 is accentuated to obtain the greatest possible support and thereby reduce the strain placed on the bolts used to attach the cutting attachment to the moldboard.

The opposite end support 36 is formed for engagement with the moldboard 12 in the same manner as end support 26. However, the end support 36 performs a dual function in that it is formed with a forwardly extending portion 44 that terminates in a wedge shaped member 46 which is preferably of spring steel. As shown in FIGURE 6, that portion of the blade 24 adjacent to the end support 36 is curved in the manner of a scythe to provide a smooth transition from the wedge shaped member 46 to the straight part of the blade 24.

The end portion 36 performs the dual functions of supporting the blade 24 and providing a means whereby land upon which relatively large trees are found can be cleared by the expedient of chipping a portion of the tree away using the wedge shaped member 46 until the tree or stump has been reduced to a diameter sufficiently small for the main portion of the blade 24 to cut it off.

Figure 8:
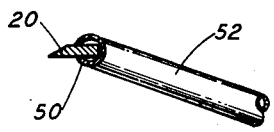
FIGURE 8 is a view, partially in cross-section, taken along lines 8—8 of FIGURE 7.

Tht pusher attachment will now be described in detail with reference to FIGURES 7 and 8. As seen in FIGURE 7, the pusher attachment comprises a pusher bar 50 mounted on the ends of a pair of push rods 52 and 54. Supporting members 56 through 62 are provided to prevent deformation of the bar 50 when the bar 50 is made to bear against trees being cleared and thereby maintain the trees at an angle which will provide the easiest and most efficient cutting during the clearing operation. The pusher attachment 16 is connected to the push arm 18, as best shown in FIGURE 1, by the flat extended portions 64 and 66 that are provided with holes 68 and 70.

As mentioned earlier, pusher bar 50 is provided with a blade 20 to further reduce the tendency of the pusher attachment 16 to slide up the trunk of the tree being cleared. As the bar 50 comes in contact with the tree being cleared, the blade 20 will cut into the tree and restrict movement of the blade up the trunk of the tree. As shown in FIGURE 8, the blade 20 is preferably at an angle of approximately 30 degrees with the plane of the pusher attachment.

The construction details can vary depending upon the materials available. All welded construction is preferred because of the strength and rigidity it imparts to the structure.

Although the invention has been described with regard to certain preferred embodiments, many changes and modifications will be obvious to those skilled in the art. The invention is to be limited not to what has been shown, but only by the scope of the appended claims.

What I claim is:

1. The combination comprising a moldboard having a blade portion and two end plates, means for propelling said moldboard and a cutting attachment, said cutting attachment comprising a mounting plate for attaching said cutting attachment to the blade portion of said moldboard, a plurality of vertically disposed, spaced apart, downwardly extending supports, each of said supports including a rearwardly extending portion, means connecting the upper portion of each of said supports to said mounting plate to define a re-entrant opening between said mounting plate and the rearwardly extending portion of each of said supports, the re-entrant opening defined by the rearwardly extending portion of each of said two side supports conforming to the shape of the lower portion of said end plates and the re-entrant opening defined by the rearwardly extending portion of each of the interior supports conforming to the shape of the lower portion of said blade portion whereby said end plates fit into the re-entrant openings defined by said side supports and the blade portion of said moldboard fits into the re-entrant openings defined by said interior supports when said mounting plate is attached to said blade portion of said moldboard, a horizontally disposed cutting blade, means for connecting said cutting blade to the lower portion of said supports, and a plurality of openings defined by said cutting blade, mounting plate and supports.

2. A cutting attachment for use with a substantially vertically disposed moldboard that comprises a mounting plate, a plurality of vertically disposed, spaced apart supports attached to and depending downwardly from said mounting plate, a horizontally disposed cutting blade attached to and supported by each of said supports, said mounting plate, said supports and said cutting blade defining a plurality of openings, each of said supports including a rearwardly extending portion, a re-entrant opening defined by each of said rearwardly extending portions and said mounting plate in the upper end of each of said supports, and means for attaching said mounting plate to the lower front portion of said moldboard, the lower portion of said moldboard extending into each of said re-entrant openings when said mounting plate is connected to said moldboard whereby each of said rearwardly extending portions is contiguous to the back of said moldboard.

3. A cutting attachment as defined in claim 2 wherein said supports include two end supports and at least one interior support, the re-entrant opening defined by said mounting plate and said rearwardly extending portion of said interior support conforming to the shape of the blade portion of said moldboard and the opening defined by said mounting plate and each of said end supports conforming to the shape of the lower portion of end plates of said moldboard.

4. A cutting attachment as defined in claim 3 wherein at least one of said end supports includes a vertical, wedge shaped portion extending forwardly from said cutting blade.

5. A cutting attachment as defined in claim 4 wherein said cutting blade includes a main portion and an arcuate portion, said arcuate portion connecting said vertical, wedge shaped member to said main portion.

References Cited in the file of this patent

UNITED STATES PATENTS

| | | |
|---|---|---|
| 2,295,458 | Edwards | Sept. 8, 1942 |
| 2,309,223 | Staring | Jan. 26, 1943 |
| 2,404,518 | Moran | July 23, 1946 |
| 2,542,952 | White | Feb. 20, 1951 |
| 2,615,262 | Reid | Oct. 28, 1952 |
| 2,701,591 | Kissner et al. | Feb. 8, 1955 |
| 2,722,758 | Loftin et al. | Nov. 8, 1955 |
| 2,934,109 | Bles | Apr. 26, 1960 |
| 3,021,619 | McGee | Feb. 20, 1962 |